(12) United States Patent
Wang et al.

(10) Patent No.: US 7,779,617 B2
(45) Date of Patent: Aug. 24, 2010

(54) SLIDING PULLEY DRIVE MECHANISM IN CUTTING PLATFORM OF LAWN MOWER

(75) Inventors: Ting Wang, Jiangsu (CN); Chaojie Zhang, Jiangsu (CN); Shengli Wang, Jiangsu (CN); Wenchen Song, Jiangsu (CN)

(73) Assignee: Jiangsu World Plant-Protecting Machinery Co., Ltd., Danyang, Jiangsu (CN)

( * ) Notice: Subject to any disclaimer, the term of this patent is extended or adjusted under 35 U.S.C. 154(b) by 0 days.

(21) Appl. No.: 12/482,523

(22) Filed: Jun. 11, 2009

(65) Prior Publication Data

US 2009/0308037 A1 Dec. 17, 2009

(30) Foreign Application Priority Data

Jun. 11, 2008 (CN) .................... 2008 2 0037529 U

(51) Int. Cl.
*A01D 34/00* (2006.01)
(52) U.S. Cl. ......................................... 56/17.5; 56/11.6
(58) Field of Classification Search ................ 56/11.6, 56/17.5, DIG. 6
See application file for complete search history.

(56) References Cited

U.S. PATENT DOCUMENTS

| | | | | | |
|---|---|---|---|---|---|
| 3,526,083 | A | * | 9/1970 | Watson et al. ................. | 56/10.7 |
| 4,205,509 | A | * | 6/1980 | Miyazawa et al. ........... | 56/11.3 |
| 4,989,398 | A | * | 2/1991 | Kuhn et al. ................... | 56/17.5 |
| 5,181,372 | A | * | 1/1993 | Hayek ......................... | 56/17.4 |
| 5,771,672 | A | * | 6/1998 | Gummerson ................. | 56/15.4 |

* cited by examiner

*Primary Examiner*—Alicia M Torres
(74) *Attorney, Agent, or Firm*—Miller, Matthias & Hull

(57) ABSTRACT

A sliding pulley drive mechanism in cutting platform of lawn mower is disclosed. The drive mechanism includes an engine for the fixed to a chassis; a cutting platform connected to, and capable of moving up and down in relation to the chassis; cutting platform drive belts fitted over the output shaft of the engine, an external spline shaft is fixed to the output shaft of the engine, and a belt pulley with an internal spline is mounted on an external spline shaft. Through a spline mechanism, the belt pulley on the engine can slide up or down on the output shaft of the engine as the elevation of the cutting platform is adjusted, so that the cutting platform drive belts are kept in the same plane, and therefore the belt service lifespan is elongated.

2 Claims, 2 Drawing Sheets

SLIDING PULLEY DRIVE MECHANISM IN CUTTING PLATFORM OF LAWN MOWER

CROSS-REFERENCE TO RELATED APPLICATIONS

This U.S. Patent Application claims priority under the Paris Convention to Chinese Patent Application No. CN 200820037529.0, filed on Jun. 11, 2008.

FIELD OF THE DISCLOSURE

The present invention relates to a lawn mower, particularly to a pulley drive mechanism in the cutting platform of a lawn mower.

BACKGROUND OF THE DISCLOSURE

In a lawn mower with a floating cutting platform, the mowing height is adjusted by adjusting the elevation of the cutting platform relative to the chassis. The floating cutting platform is one of the most common applied mechanisms in lawn mowers. The structure of the cutting platform is: an engine is fixed to the chassis, and the engine transfers power to the belt pulley on the cutting platform via the belt pulley fixed to the engine and the drive belts on the cutting platform. Since the elevation of the cutting platform relative to the chassis is adjustable, the elevation of the belt pulley fixed to the cutting platform is variable accordingly, in relation to the belt pulley fixed to the engine. As a result, the drive belts that connect the two belt pulleys are often oblique. Oblique belts will enhance belt abrasion and greatly shortened belt service lifespan.

In order to overcome above technical drawbacks, in some current lawn mowers, the belt inclination is reduced by reducing the adjusting range of the cutting platform, so as to increase belt service lifespan. However, the applicability of the integral unit will be reduced due to the range reduction of mowing height. In some lawn mowers, two belt pulleys are designed below the engine, wherein, the upper belt pulley matches higher elevation of the cutting platform, while the lower belt pulley matches lower elevation of the cutting platform, so as to attain the object of reducing belt inclination. However, a lawn mower with such a mechanism is difficult to operate, and hard to remember the belt pulley switching operation. Once the operator forgets to switch the belt pulley, the belt will be more oblique, and the belt service lifespan will be shortened even more.

SUMMARY OF THE DISCLOSURE

The object of the present invention is to overcome the technical drawbacks in the prior art and provide a sliding pulley drive mechanism in the cutting platform of a lawn mower, so as to solve the problem of belt inclination that commonly exists in the cases of fixed belt pulleys.

The technical scheme employed in the invention is: An engine for the pulley drive mechanism is fixed to a chassis; a cutting platform is connected to the chassis, and can move up and down in relation to the chassis; a bracket is fixed to the cutting platform; cutting platform drive belts are fitted over the output shaft of the engine, a shaft with an external spline shaft is fixed to the output shaft of the engine, and a belt pulley with an internal spline is mounted on the an external spline shaft; the cutting platform drive belt is mounted on the belt pulley with an internal spline; the lower end of the belt pulley with an internal spline is connected with a shock absorbing bushing, a bearing, and a bearing base plate. The bearing base plate is connected to the bracket.

In this invention, with a spline mechanism, the belt pulley on the engine can slide up or down on the output shaft of the engine as the elevation of the cutting platform is adjusted, so that the cutting platform drive belts are kept in the same plane, and therefore the belt service lifespan is elongated.

BRIEF DESCRIPTION OF THE DRAWINGS

Hereafter this invention will be further detailed in the embodiments, with reference to the accompanying drawings.

Figure 1:
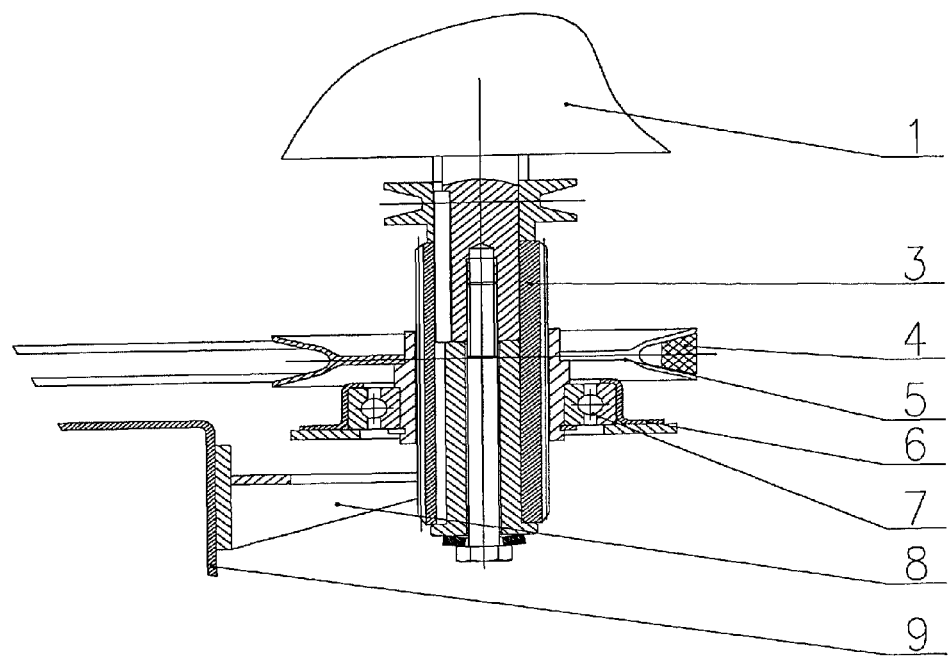
FIG. 1 is a front sectional view of the invention.

Wherein, in the drawings: 1. engine; 2. belt retaining pole; 3. external spline shaft; 4. cutting platform drive belt; 5. belt pulley with an internal spline; 6. bearing base plate; 7. bearing; 8. bracket; 9. cutting platform; 10. shock absorbing bushing; 11. arresting pin.

DETAILED DESCRIPTION OF THE DISCLOSURE

Figure 2:
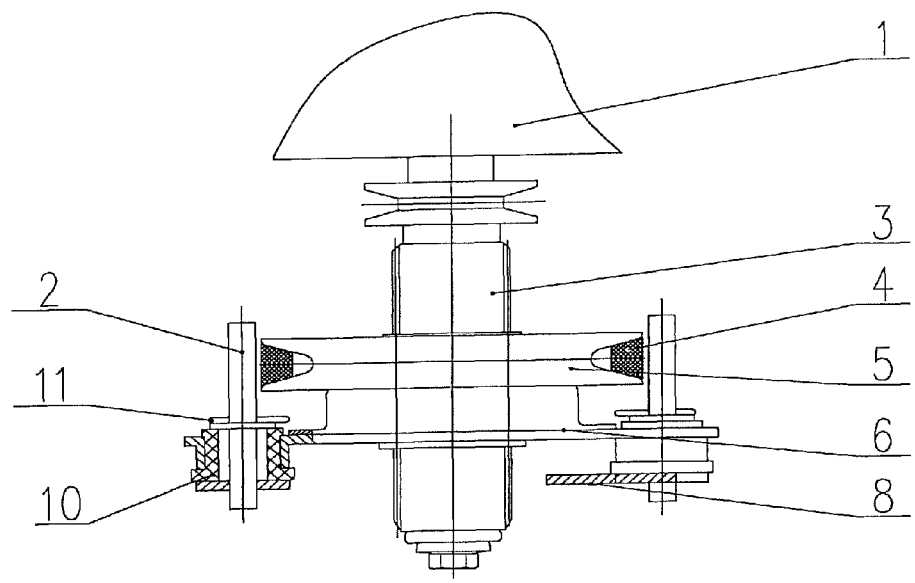
FIG. 2 is a right broken-out section view of the structure shown in FIG. 1.
Figure 3:
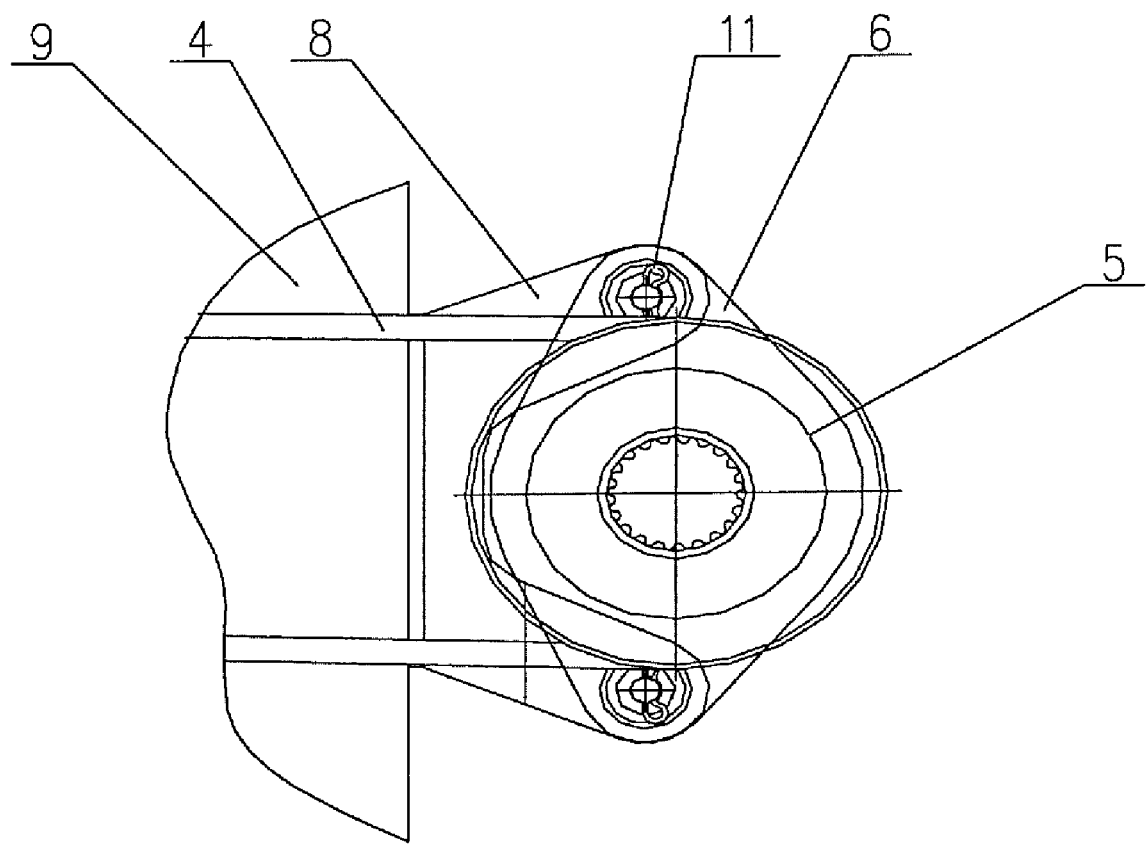
FIG. 3 is a top view of the structure shown in FIG. 1.

As shown in FIG. 1~3, in the pulley drive mechanism in the cutting platform of a lawn mower, an engine 1 is fixed to a chassis; a cutting platform 9 is connected to the chassis, and can move up and down in relation to the chassis. Cutting platform drive belts 4 are fitted over the output shaft of the engine 1; an external spline shaft 3 is fitted over the output shaft of the engine 1, and an external spline shaft 3 is secured to the engine 1. A belt pulley 5 with an internal spline is mounted on an external spline shaft 3; and the belt pulley 5 with an internal spline is fitted over an external spline shaft 3 and can slide up and down on the shaft 3. The cutting platform drive belts 4 are mounted on the belt pulley 5 with an internal spline. A short-absorbing bushing 10, the belt pulley 5 with an internal spline, a bearing 7, and a bearing base plate 6 are connected together. The belt pulley 5 with an internal spline is connected to the inner race of the bearing 7, and the bearing base plate 6 is connected to the outer race of the bearing 7. The shock absorbing bushing 10 is fixed in two holes on the two ends of the bearing base plate 6. The bearing base plate 6 is connected to the bracket 8 via the bottom part of the two belt retaining poles 2; the bracket 8 is connected to the cutting platform 9; the belt retaining poles 2 pass through the two holes on the two ends of the bearing base plate 6, and a arresting pin 11 is mounted on the top end of each belt retaining pole 2 to prevent fallout. In that way, an assembly is formed. When the elevation of the cutting platform 9 is increased, the cutting platform 9 drives the belt pulley 5 with an internal spline via the bracket 8 and the bearing base plate 6 to slide up or down along the external spline shaft 3, and the power of the engine 1 can be transferred through the spline pair and the cutting platform drive belt to the cutting platform 9.

The invention claimed is:

1. A sliding pulley drive mechanism in the cutting platform of a lawn mower, comprising: an engine for the pulley drive mechanism fixed to a chassis; a cutting platform connected to the chassis, and capable of moving up and down in relation to the chassis; a bracket fixed to the cutting platform; cutting platform drive belts fitted over an output shaft of the engine and connecting the output shaft to the cutting platform; wherein, an external spline shaft is fitted over the output shaft of the engine; a belt pulley with an internal spline is mounted on the external spline shaft; the cutting platform drive belts are mounted on the belt pulley with an internal spline; the lower end of the belt pulley with an internal spline is connected with a shock absorbing bushing, a bearing, and a bearing base plate; the bearing base plate is connected to the bracket, wherein, the belt pulley with an internal spline is connected to an inner race of the bearing, while the bearing base plate is connected to an outer race of the bearing; the shock absorbing bushing is fixed to the bearing base plate.

2. A sliding pulley drive mechanism in the cutting platform of a lawn mower, comprising: an engine for the pulley drive mechanism fixed to a chassis; a cutting platform connected to the chassis, and capable of moving up and down in relation to the chassis; a bracket fixed to the cutting platform; cutting platform drive belts fitted over an output shaft of the engine and connecting the output shaft to the cutting platform; wherein, an external spline shaft is fitted over the output shaft of the engine; a belt pulley with an internal spline is mounted on the external spline shaft; the cutting platform drive belts are mounted on the belt pulley with an internal spline; the lower end of the belt pulley with an internal spline is connected with a shock absorbing bushing, a bearing, and a bearing base plate; the bearing base plate is connected to the bracket, wherein, the bearing base plate is connected to the bracket via two belt retaining poles, the two belt retaining poles pass through holes on the bearing base plate, and an arresting pin is mounted on the top end of each belt retaining pole.

* * * * *